US005936245A

United States Patent [19]

Goillot et al.

[11] Patent Number: 5,936,245

[45] Date of Patent: Aug. 10, 1999

[54] METHOD AND SYSTEM FOR REMOTE SENSING OF THE FLAMMABILITY OF THE DIFFERENT PARTS OF AN AREA FLOWN OVER BY AN AIRCRAFT

[75] Inventors: Charles Goillot, St. Germain de la Grange; Alain Wadsworth, Jouy en Josas; André Sander, Fourqueux; André Renot, Franconville, all of France

[73] Assignee: Institut Francais du Petrole, Rueil-Malmaison, France

[21] Appl. No.: 08/867,193

[22] Filed: Jun. 2, 1997

[30] Foreign Application Priority Data

Jun. 3, 1996 [FR] France .................................. 96 06906

[51] Int. Cl.[6] .............................. G01J 3/50; G08B 17/12; G01N 21/25

[52] U.S. Cl. .................... 250/330; 348/144; 250/399.05; 250/339.15; 250/339.11; 250/341.8

[58] Field of Search .................................... 348/144, 145, 348/146, 147; 250/339.02, 339.01, 339.05, 339.15, 339.14, 339.11, 330, 332, 338.5, 341.8, 342

[56] References Cited

U.S. PATENT DOCUMENTS

| | | | |
|---|---|---|---|
| 4,227,211 | 10/1980 | Disbrow | 348/144 |
| 4,463,261 | 7/1984 | Bowman | 250/339.11 |
| 4,785,292 | 11/1988 | Kern et al. | 250/339.15 |
| 5,051,595 | 9/1991 | Kern et al. . | |
| 5,214,503 | 5/1993 | Chiu et al. | 250/330 |
| 5,471,056 | 11/1995 | Prelat | 250/332 |

FOREIGN PATENT DOCUMENTS 33 18 974 of 1984 Germany .

OTHER PUBLICATIONS

Proceedings of the International Airborne Remote Sensing Conference and Exhibition, Vol. 2, Sep. 12, 1994 p. 129–141, Abrosia V.G. et al; “AIRDAS, Development of a Unique Four–Channel . . . Disaster Assessment”.

*Primary Examiner*—Constantine Hannaher
*Assistant Examiner*—Darren M. Jiron
*Attorney, Agent, or Firm*—Antonelli,Terry, Stout & Kraus, LLP

[57] ABSTRACT

The invention is a method and system for detecting, by means of specific processings of images of an area flown over taken in several spectral bands, signs indicative of a stress of the vegetation and the presence of spots where fire is likely to occur or spread. Images of the area flown over are acquired by means of a photography device (1) in a first spectral band selected in the red part (R) of the visible spectrum, in a second spectral band of the near infrared spectrum (N.I.R.) and in a third spectral band in the thermal infrared spectrum selected to locate parts of the area showing both a hydric stress and hot spots. Coded composite images are obtained by color coding of the aforementioned spectral bands and the images obtained in the three spectral bands are combined by means of a processing system (12, 13), which identifies fire development hazards caused by water deficit and local overheating. The system can be used for fire forecast, protection and fighting.

25 Claims, 3 Drawing Sheets

METHOD AND SYSTEM FOR REMOTE SENSING OF THE FLAMMABILITY OF THE DIFFERENT PARTS OF AN AREA FLOWN OVER BY AN AIRCRAFT

BACKGROUND OF THE INVENTION

1. Field of the Invention

The present invention relates to a method and to a system for remote sensing: of the flammability of the different parts of an area flown over by an aircraft in order to facilitate preventive actions in the most threatened parts.

2. Description of the Prior Art

Fire hazards that can affect a vegetal area depend on many factors. Some factors among the major ones are:

1) the structure of the plant cover, the presence of composite dead plants being a favoring factor according to the density thereof;

2) the botanic composition of the plant cover, because certain vegetal species are more vulnerable than others, brushwoods and dead plants for example are more flammable than timber trees, certain tree species such as coniferous trees for example are more flammable than others. The study of this factor involves an analysis of the plant cover maps, followed by a photographic survey allowing the analysis to be refined;

3) the orientation of the slopes on which the vegetation grows, the slopes getting the most sunshine being the most vulnerable to the action of the fire. A digital terrain model (DTM) of the area studied is generally used to take account of this second risk factor; or 4) the hydric deficit of the soil indicating a hydric stress of the vegetation, which decreases the natural ability of plants to regulate their temperature through evaporation.

Detection of hot spots at the ground surface by remote sensing is a relatively old technique. Various studies relating to phenomena linked with fires which are detectable by remote sensing, to the use of radiation in the thermal band and image processing methodologies are described for example in the following documents:

Hirsch S. N. et al., 1973, The Bispectral Forest Fire Detection System, in The Surveillant Science, Holz Ed., Houghton Mifflin Cy, Boston;

Goillot C. et al., 1988, Etude Dynamique des Feux de Forêts par Scanner Aéroporté Multibande dans le Visible et le Thermique, in Proceedings ISPRS, Kyoto;

Leckie D. G., 1994, Possible Airborne Sensor, Processing and Interpretation Systems for Major Forestry Applications, in Proceedings of the first International Airborne Remote Sensing Conference and Exhibition (I.A.R.S.C.E.), Strasbourg; or Ambrosia V. G. et al., AIRDAS, 1994 Proceedings of the I.A.R.S.C.E., Strasbourg.

It is well-known to combine signals corresponding to radiations emanating from a surface element on the ground, in the red part of the spectrum (0.6 $\mu$m<$\lambda_1$<0.7 $\mu$m for example) and the near infrared (0.8 $\mu$m<$\lambda_1$<1.1 $\mu$m for example), which allows, after normalization, the obtaining of the state of "hydric stress" of vegetable matter i.e. to know if it has enough water resources to compensate for the evaporation corresponding to the ambient temperature. Such a combination used aboard a satellite is described for example in:

Che N. et al., Survey or Radiometric Calibration Results and Methods for Visible and Near Infrared Channels of NOAA-7, -9 and -11 AVHRRs, in Remote Sens. (1992).

Various techniques implementing fire remote sensing are also described in French Patents 2,224,818, 2,614,984, and 2,643,173, European Patents 490,722 and 611,242, and WO-93/02,749.

In regions where chronic fire hazards are high, mainly during the warm season, in their concern for good management of the national heritage, have installed ground or airborne detection systems allowing early alert of the fire-fighting forces and allowing analysis of the various parameters characteristic of the fire that has broken out and for following the spread thereof.

Fighting a fire is generally more effective if it is possible to foresee or to predict how it is likely to break out and to spread, so as to start preventive actions such as surface watering in areas that appear to be the most threatened after analysis.

SUMMARY OF THE INVENTION

The invention determines by remote sensing the flammability of the different parts of an area flown over by an aircraft in order to facilitate preventive actions on the parts presenting the highest risks, either before any fire outbreak or if the fire already exists, in order to better protect the areas outside the fire front and notably to prevent possible reoccurances of fire.

An image sensor acquires of the vegetation area from radiation emitted and reflected by the ground and the plant cover which is moved above the area (in an aircraft for example), changes of state of the vegetation are detected by analysis of three spectral bands, a first spectral band being selected in the red part (R) of the visible spectrum according to the type of vegetation, a second spectral band in the near infrared spectrum (N.I.R.) suited to reproduce the state of turgescence of the aerial parts of this vegetation, and at least a third spectral band in the thermal infrared spectrum (I.R.) selected to locate parts of the vegetation area having a higher temperature than the surrounding parts of the area, and a composite image obtained by coding and superposing the images obtained in the three spectral bands and showing the fire risks of the area flown over is formed.

The signals obtained in the first and the second spectral band (R, N.I.R.) are preferably combined by assigning a first coding to the combined image so as to obtain images showing the vegetation parts of the area flown over that have a hydric deficit, a second coding is assigned to the image obtained in the third band and the images thus coded are superposed so as to obtain a synthetic image displaying the most threatened portions of the vegetation area.

The signals forming each of the images that are part of the composite image are preferably weighted according to the average state of the area monitored.

According to a mode of implementation, the combination of the signals obtained in the red and near infrared spectral bands comprises determining a combination signal (S) that is the product of two indices $I_1$ and $1_2$ defined by the following relations:

$$I_1=(g_2\cdot S_2+g_1\cdot S_1)/(g_2\cdot S_2-g_1\cdot S_1),$$

and $$I_2=g_2\cdot S_2/g_1\cdot S_1,$$

where $S_1$ and $S_2$ are the signals to which gains $g_1$, $g_2$ are respectively assigned and that are delivered by the image sensor for acquiring images in the first (R) and the second (N.I.R.) spectral band.

RGB type color coding is selected so as to assign a first color to the composite image resulting from the combination, to assign a second color to the image obtained in the third spectral band (I.R.), and a third color is assigned to the threatened vegetation area portions by additive synthesis.

The wavelengths ($\lambda_1$) of the first frequency band (R) are selected for example in the 0.6 $\mu$m<$\lambda_1$<0.7 $\mu$m range and preferably close to 0.65 $\mu$m, the central wavelength and the bandwidth being selected according to the dominant vegetal population, the wavelengths ($\lambda_2$) of the second frequency band (N.I.R.) in the 0.8 $\mu$m<$\lambda_2$<1.1 $\mu$m range and preferably close to 0.9 $\mu$m. The wavelengths ($\lambda_3$) of the third frequency band (I.R.) are selected either in the 8 $\mu$m<$\lambda_3$<14 $\mu$m range, preferably in the 10.5 $\mu$m<$\lambda_3$<12.5 $\mu$m range, or in the 3 $\mu$m<$\lambda_3$<5 $\mu$m range.

The synthetic image is formed prior to being transmitted by radio to a ground processing station.

The system according to the invention includes an acquisition device designed to acquire images of the vegetation area from radiation emitted and reflected by the ground and the plant cover thereof and a transmitter which transmits the images to a ground station, a selector for selecting at least three spectral bands, a first spectral band being selected in the red part (R) of the visible spectrum according to the type of vegetation, a second spectral band in the near infrared spectrum (N.I.R.) suited to reproduce the state of turgescence of the aerial parts of this vegetation, and at least a third spectral band in the thermal infrared spectrum (I.R.) selected to locate parts of the vegetation area having a higher temperature than the surrounding parts of the area, and an image processing unit which forms a composite image obtained by coding and superposing the images obtained in the three spectral bands, showing the fire risks of the area flown over.

The processing unit is preferably at least partly in the aircraft and weights the signals forming each of the images that are part of the composite image according to the average state of the area monitored, and at least one calculator which combines the signals corresponding to the red (R) and the near infrared (N.I.R.) spectral bands so as to obtain an image showing the vegetation parts of the area flown over that present a hydric deficit. a color codes for the combination of signals and a device for applying artificial colors suited to make the area parts presenting fire risks stand out by additive synthesis.

The method according to the invention provides more than simple detection of fires in progress by detecting hot spots in areas already displaying a state of hydric stress and therefore those that are potentially the most likely to spread the fire or to promote the outbreak thereof, or to promote reigniting of a fire in parts where the fire is believed to be controlled.

BRIEF DESCRIPTION OF THE DRAWINGS

Other features and advantages of the method and of the system according to the invention will be clear from reading the description hereafter of embodiments given by way of non limitative examples, with reference to the accompanying drawings in which.

DESCRIPTION OF THE PREFERRED EMBODIMENTS

Figure 1:
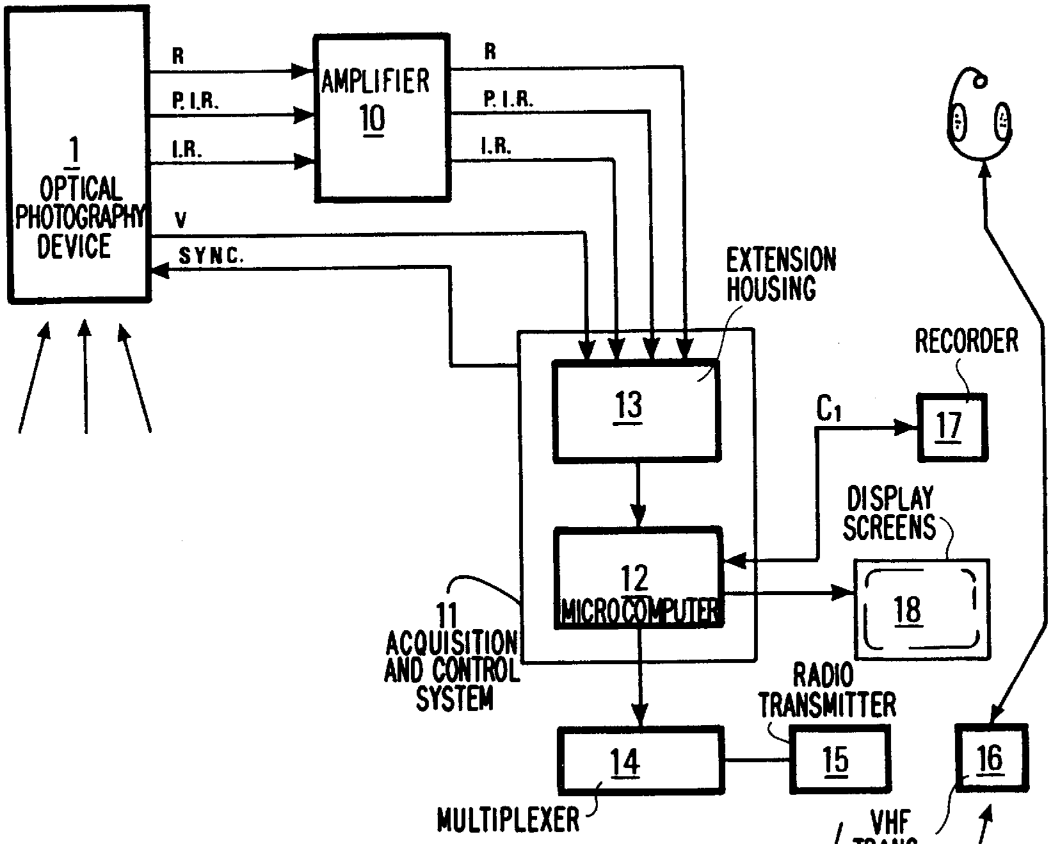
FIG. 1 illustrates the airborne part of the monitoring system allowing acquisition and preprocessing of images of an area flown over.

The detection system E1 taken which is located on an aircraft includes (FIG. 1) an optical photography device 1 suited to select and to record three spectral bands in the radiation emanating from an area to be monitored, whose analysis reveals different characteristics of the plant cover. Optical device 1 is suited to select, according to the type of vegetation, a first spectral band (R) in the red part of the visible spectrum allowing detection of threatened portions of the area presenting a hydric deficit, a second spectral band in the near infrared spectrum (N.I.R.) suited to reproduce the state of turgescence of the aerial parts of this vegetation, and a third spectral band in the thermal infrared spectrum (I.R.) selected to locate parts of the vegetation area displaying a certain differential overheating in relation to neighboring parts. Optical device 1 is also suited to perform color recordings of the landscape flown over.

Figure 2:
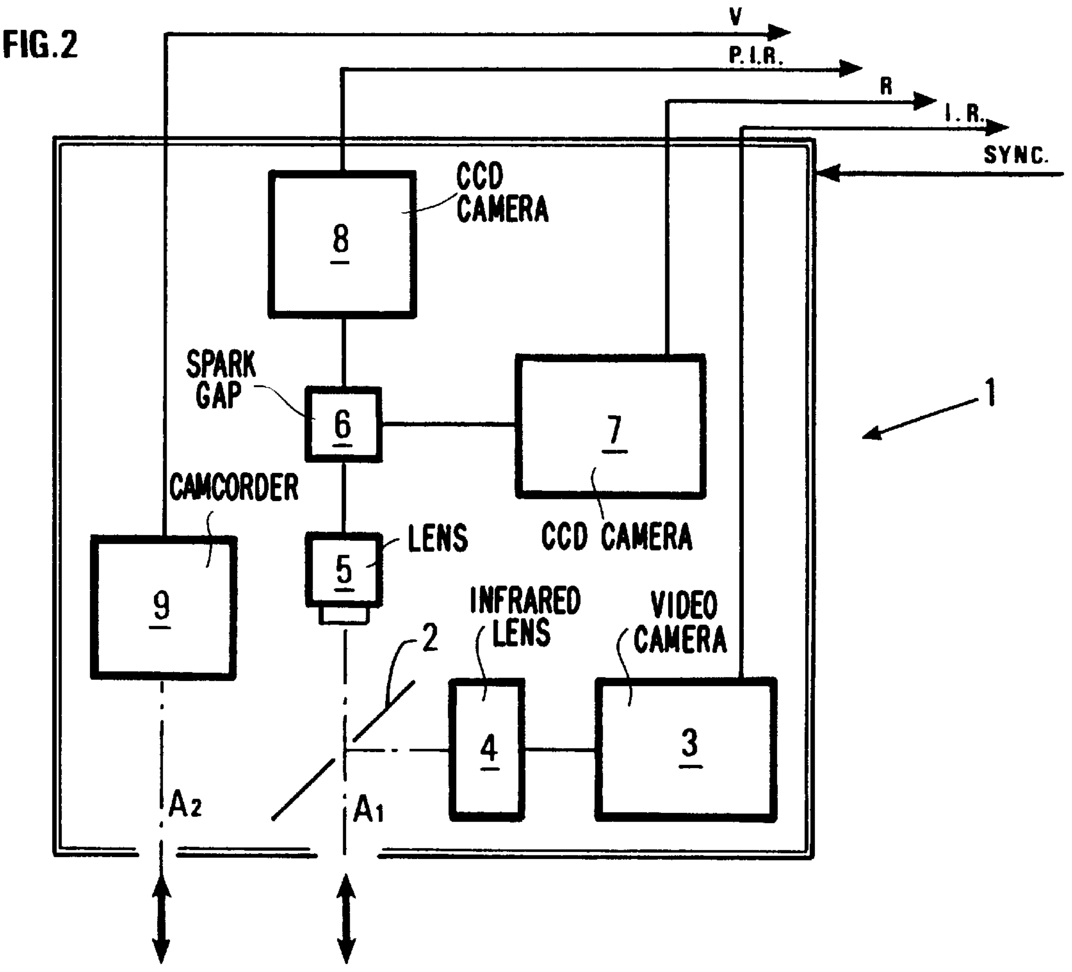
FIG. 2 shows an example of a photography device that can be used for acquisition of images aboard the aircraft.

According to the embodiment of FIG. 2, this photography device 1 comprises for example three video cameras aligned along the same optical axis A1. An oblique mirror 2 deflects the incident beam towards a first video camera 3 provided with an infrared lens 4. This video camera 3 records infrared images in at least one band $\lambda_3$ of the thermal infrared (I.R.) spectrum selected, as the case may be. in the spectral band ranging between 3–5 $\mu$m or in the spectral band ranging between 8–14 $\mu$m. As water vapor and clouds cause the atmosphere to be very absorbent in the spectral band between 5 and 8 $\mu$m, the effects of water vapor and clouds are preferably eliminated from the field of view although it may mean considerably reducing the possible altitudes at which the area to be monitored is flown over. The incident beam also goes through a lens 5 suited to select a spectral band containing the wavelengths $\lambda_1$ and $\lambda_2$ respectively in the red (R) and the near infrared (N.I.R.). The emergent beam is divided by a spectral spark gap 6. The beam in the red part R of the spectrum (0.6<$\lambda_1$<0.7 $\mu$m) is recorded by the CCD type second camera 7 for example. The beam in the near infrared part (N.I.R.) of the spectrum ($\lambda_2$) is recorded by the CCD type third camera 8 for example. A camcorder 9 whose optical axis A2 is substantially parallel to the common optical axis A1 of the three cameras 3, 7, 8, is also used to obtain, in sync with the two video cameras, the color views of the area monitored.

The video signals $S_1(\lambda_1)$ (channel R), $S_2(\lambda_2)$ (channel N.I.R.), $S_3(\lambda_3)$ (channel I.R.) delivered respectively by these three cameras 3, 7, 8 and $S_4$ from camcorder 9 (channel V) are applied (FIG. 1) to an amplifier 10 suited to apply selectively to signals $S_1$ to $S_3$ respectively (channels R, N.I.R., I.R. respectively) amplification gains $g_1$, $g_2$, $g_3$. The amplified signals are applied to an acquisition and control system 11.

This system includes a microcomputer 12 provided with an extension housing 13 comprising acquisition cards for the various video signals $S_1$ to $S_4$ coming from the four cameras. The microcomputer is designed to perform certain preprocessings of the video signals as explained in the description hereafter. These video signals are also applied to a multiplexer 14 that delivers them sequentially to a radio transmitter 15 suited to transmit them to ground station E2. A VHF transmitter-receiver 16 allows phonic communication between the two units E1, E2. Acquisition and control system 11 generates synchronization signals SYNC for the various cameras of the photography system 1.

Acquisition and control system 10 also comprises a recording device 17 of the tape or optical disk recorder/reader type for example, connected to microcomputer 12 by a cable C1 for transfer of the recording and reading signals, and it is associated with one or more display screens 18.

Figure 3:
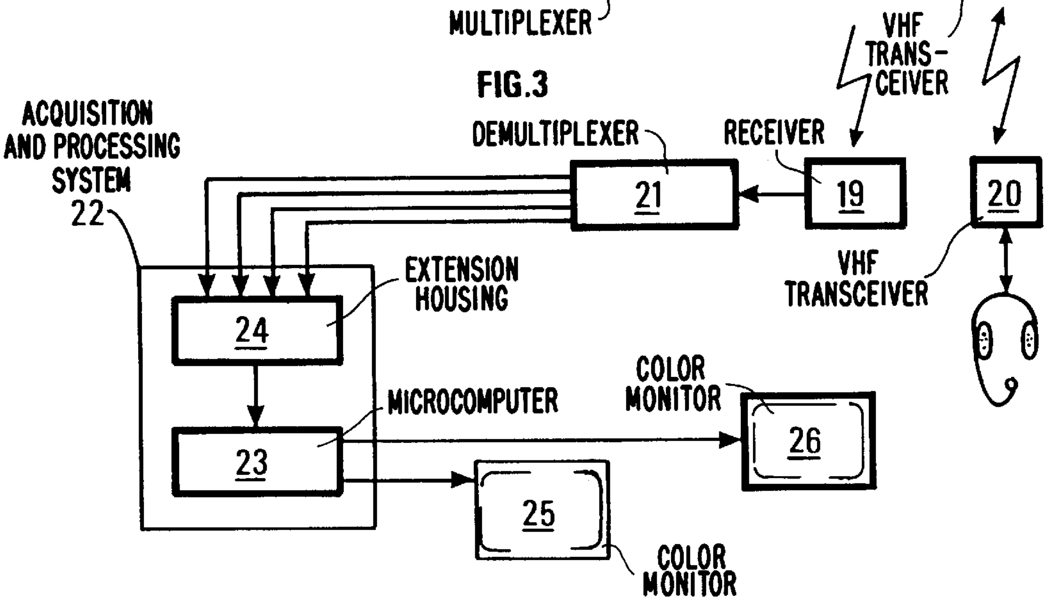
FIG. 3 illustrates the airborne part of the monitoring system installed in a ground station, allowing acquisition, processing and analysis of images of an area flown over, pointing up the phenomena monitored.

Ground unit E2 comprises (FIG. 3) a radio receiver 19 suited to detect the video signals emitted from the airborne device E1. A VHF transmitter-receiver 20, analogous to element 16, (FIG. 1) allows phonic communication with the onboard device E1. A demultiplexer 21 connected to video receiver 18 separates the various channels received sequentially I.R., N.I.R., R and V and applies them on separate lines to an acquisition and processing system 22.

This system includes a microcomputer 23 provided with an extension housing 24 comprising acquisition cards for the various video signals $S_1$ to $S_4$ transmitted and color video monitors 25 and 26 for displaying the images received from the aircraft and/or the images processed by microcomputer 23.

The onboard microcomputer 12 and microcomputer 23 in the reception station are fitted with softwares for processing the digitized images supplied by the various cameras 3, 7, 8 allowing the display of significant visual changes, as described hereafter, prior to the transmission thereof to the ground station tor other complementary processings.

Figure 4:
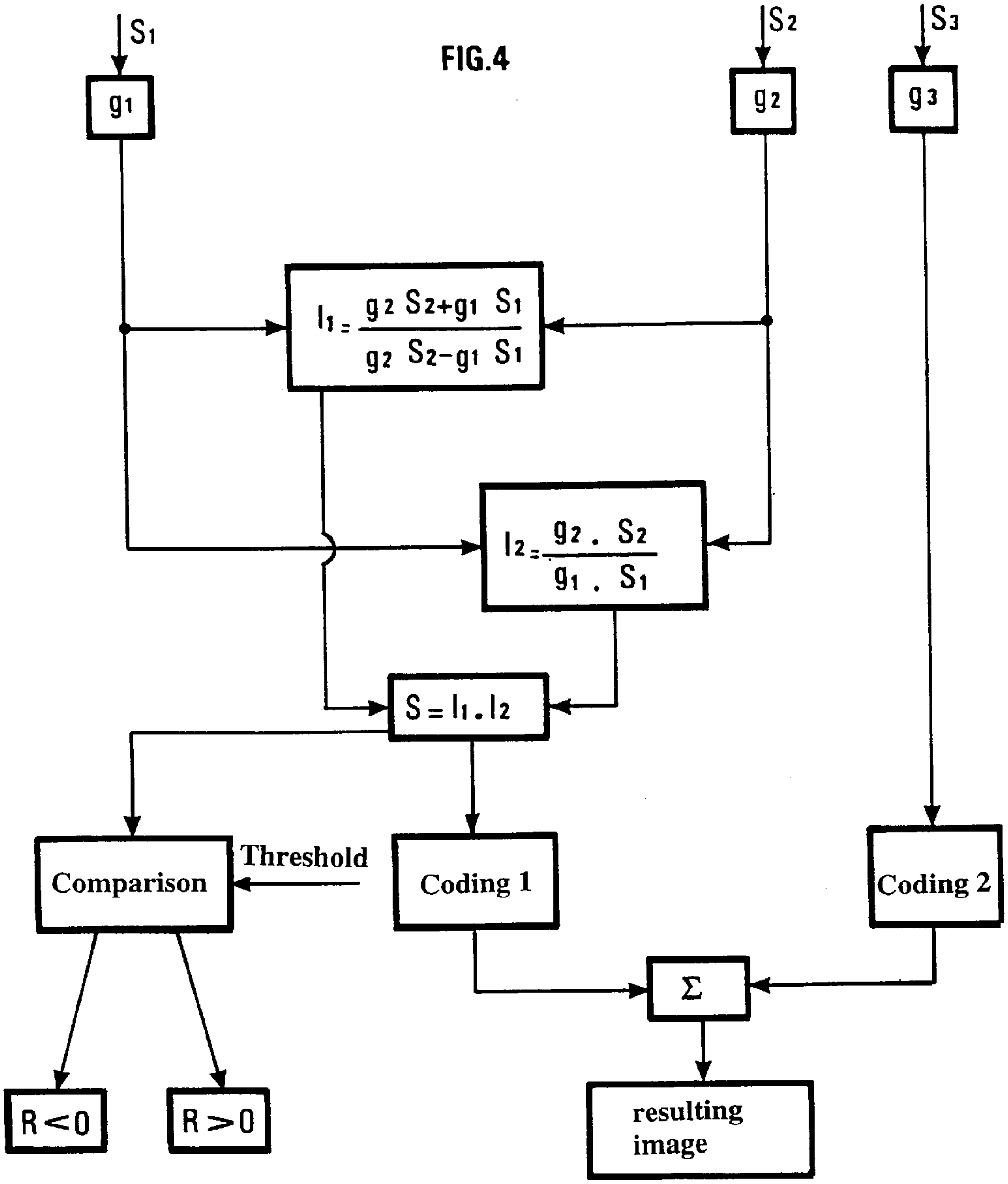
FIG. 4 shows a flowchart of the processing stages performed on the video signals acquired.

As can be seen in the flowchart of FIG. 4, signals $S_1$ and $S_2$ amplified with the respective gains $g_1$ and $g_2$ are combined to determine a first composite signal S indicative of a vegetal activity and therefore of the presence of humidity. A first composite signal $I_1$ is formed by means of the following relation:

$$I_1=(g_2 \cdot S_2+g_1 \cdot S_1)/(g_2 \cdot S_2-g_1 \cdot S_1) \quad (1),$$

and a second composite signal $I_2$ indicative of the presence of vegetation is formed by means of the following relation $$I_2=g_2 \cdot S_2/g_1 \cdot S_1 \quad (2).$$

A combination signal $S=I_1 \cdot I_2$ that is compared to a threshold value determined according to the type of vegetation in the area monitored is formed from composite signals $I_1$ and $I_2$. A relatively high signal S (R>0) shows that the part of the area observed has a relatively healthy vegetation. When this signal S is relatively low (R<0), it means that the portion of area observed has a vegetation that suffers from a lack of humidity.

The amplified signal $S'=g_3 \cdot S_3$ obtained in the thermal infrared I.R. is all the higher as the temperature of the portion of area flown over is markedly warmer in relation to the surrounding grounds.

In order to facilitate detection of signs indicative of the flammability of the various parts successively flown over, a first optical coding is associated with the combined signal S and another optical coding with signal S'. They are easily given artificial colors so as to obtain by additive synthesis, on the same display screen, a coded image directly indicative of a flammability risk.

A RGB type coding can for example be used by assigning for example a green artificial color to signal S and a red artificial color to signal S' so that the areas at risk appear, by additive synthesis, in the form of more or less marked shades of yellow according to the respective intensities of the two combined composite images S and S'.

Thus, the area portions flown over where signals S and S' are both relatively high appear in the form of a more or less clear yellow color which is a sign of a more or less high flammability risk that is confirmed if signal S' is simultaneously relatively high.

It is also possible, by way of complementary check, to form another index $I_1$ indicative of the presence of vegetation on the ground, if means for selecting a band $\lambda_0$ of the visible spectrum in wavelengths below those of the R band (signal $S_1$) are available aboard the aircraft.

$$I_0=(\Sigma S_2-\Sigma S_0)/(\Sigma S_2+\Sigma S_0)$$

is thus determined, where $\Sigma S_2$ and $\Sigma S_0$ represent respectively the energies received in the two bands $\lambda_0$ and $\lambda_2$. Since the energy received from a bare ground is generally higher than that emanating from a soil covered with vegetation in the band $\lambda_0$, whereas it is generally lower in the band $\lambda_2$, comparing this index with another threshold value (0.5 for example) is sufficient to know, if need be, the type of ground flown over.

Sharing out of the image processing tasks between the acquisition and processing systems 12, 23 (FIGS. 1, 3) can change as the case may be. The two systems can perform the same real-time processings. It is however possible. in order to facilitate the task of the personnel aboard, to select predetermined standard gain controls and weightings prior to flying over the area, according to the type of area to be monitored, the objective being essentially to check that the images acquired and transmitted are qualitatively correct. In this case, the personnel at the reception station is given a greater freedom to change the gains of the various signals and the respective weightings of the signals belonging to the combinations in order to fine down their interpretation of the images received.

According to a particular embodiment, the radio link between the aircraft and the ground station can be achieved via a radio relay, which allows the area monitored to be widened.

For implementing the invention, wavelength $\lambda_1$ is preferably selected around 0.65 $\mu$m and wavelength $\lambda_2$ preferably around 0.9 $\mu$m, the central wavelength and the bandwidth being selected according to the dominant vegetal population.

The method according to the invention allows integration in the analysis of data relative to the hot spots in areas that have not been hit by a fire yet. The temperature differences observed can be due for example to local fermentation phenomena. The temperature of hot spots low in relation to that of a flame or of a forest fire and the corresponding radiation can be detected in the thermal infrared spectrum (I.R.). The wavelength $\lambda_3$ of the third frequency band is selected as the case may be in the 8 $\mu m<\lambda_1<14$ $\mu$m range and preferably between 10.5 and 12 $\mu$m to reduce the influence of the atmosphere, or in the 3 $\mu m<\lambda_1<5$ $\mu$m range according to the temperature range sought. Detection of these hot spots provides knowledge of the most exposed places before a fire breaks out or spreads, or possible spots for catching back on fire.

The method can also be used preventively in order to locate the areas at risk and, if a vegetation map that can be superposed on the images is available, to io associate with the areas flown over a potential flammability index. It thus opens up possibilities of corrective action such as preventive watering of the most flammable areas at times of the day when the risk is the highest.

The method according to the invention can also be implemented by applying the preceding processings to images acquired and preprocessed by other systems and notably by the system described in the assignee's patent application 96/06,907. This system comprises an on-board equipment including a CCD matrix type photography device designed to acquire images of successive bands of an area flown over in one or more spectral bands spread by dispersion means and a processing unit associated with trajectory and trim determination which allows selection of the site in one or more spectral bands whose respective widths and spectral functions can be changed at will according to the nature of the phenomena to be analyzed within the scope of the application where it is used and also to easily connect images shifted by fluctuations of the aircraft trajectory, notably due to roll.

Images of radiations in two separate spectral bands of the IR. spectrum can be formed between 3 and 5 μm for example on the one hand and between 8 and 14 μm for example on the other without departing from the scope of the invention.

We claim:

1. A method for determining flammability of different parts of a vegetation area flown over by an aircraft, in order to facilitate preventive or fire fighting actions, comprising:

at least one aircraft, equipped with an image acquisition device, acquiring images of the vegetation area from radiation emitted and reflected by the ground and plant cover thereof by moving above the area;

detecting changes of state of the plant cover by analysis of light received in two spectral bands including a first spectral band ($\lambda_1$) in a red part of a visible spectrum according to a type of vegetation and a third spectral band ($\lambda_3$) in a thermal infrared spectrum, to locate parts of the vegetation area having a higher temperature than surrounding parts of the area;

selecting a second spectral band ($\lambda_2$) for reproducing a state of turgescence of aerial parts of the plant cover in a near infrared spectrum;

combining signals obtained in the first and the second spectral bands to form a combined image showing parts of the plant cover of the vegetation area flown over by the aircraft having a hydric deficit;

assigning to the combined image a first color coding;

assigning a second color coding to an image obtained from the third spectral band; and superposing the images with the first coding and the second coding to form a synthetic image showing portions of the vegetation area having a highest flammability.

2. A method as claimed in claim 1, comprising:

weighting signals forming each of the images that are part of the synthetic image according to an average state of the vegetation area.

3. A method as claimed in claim 2, wherein:

the combination of signals in the first and second spectral bands comprises producing a combination signal as a product of two indices $I_1$ and $I_2$ defined by the following relations:

$$I_1=(g_2\cdot S_2+g_1\cdot S_1)/(g_2\cdot S_2-g_1\cdot S_1),$$

and $$I_2=g_2\cdot S_2/g_1\cdot S_1,$$

where $S_1$ and $S_2$ are signals to which gains $g_1$ and $g_2$ are respectively applied and are delivered by the image acquisition device in the first and the second spectral bands.

4. A method as claimed in claim 2, further comprising:

selecting a RGB type color coding and assigning a first color to the combined image and a second color to the image obtained in the third spectral band, and assigning a third color, by additive synthesis, to threatened vegetation areas.

5. A method as claimed in claim 1, wherein:

wavelengths ($\lambda_1$) of the first spectral band are selected in the range 0.6 $\mu$m<$\lambda_1$<0.7 $\mu$m, and a bandwidth of the first spectral band is selected according to a dominant vegetal population of the vegetation area.

6. A method as claimed in claim 1, wherein:

wavelengths ($\lambda_1$) of the first spectral band are substantially 0.65 $\mu$m.

7. A method as claimed in claim 1, wherein:

the wavelengths ($\lambda_2$) of the second spectral band are selected in the range 0.8 $\mu$m<$\lambda_2$<1.1 $\mu$m.

8. A method as claimed in claim 1, wherein:

wavelengths ($\lambda_2$) of the second spectral band are substantially 0.9 $\mu$m.

9. A method as claimed in claim 1, wherein:

wavelengths ($\lambda_3$) of the third spectral band are selected in the range 8 $\mu$m<$\lambda_3$<14 $\mu$m.

10. A method as claimed in claim 1, wherein:

the wavelengths ($\lambda_3$) of the third spectral band are selected in the range 10.5 $\mu$m<$\lambda_3$<12 $\mu$m.

11. A method as claimed in claim 1, wherein:

the wavelengths ($\lambda_3$) of the third spectral band are selected in the range 3 $\mu$m<$\lambda_3$<5 $\mu$m.

12. A system for determining flammability of different parts of a vegetation area flown over by an aircraft in order to facilitate preventive actions, comprising:

an acquisition device for acquiring images of the vegetation area from radiation emitted and reflected by a ground area and plant cover thereof;

a radio transmission device connecting the aircraft to a ground station;

a selector which selects at least three spectral bands, a first spectral band being selected in the red part of a visible spectrum according to a type of vegetation, a second spectral band in a near infrared spectrum, for reproducing a state of turgescence of aerial parts of the plant cover, and a third spectral band in a thermal infrared spectrum selected to locate parts of the vegetation area having a higher temperature than surrounding parts thereof;

an image processing unit which weighs signals forming each of the images that are part of a composite image according to an average state of the vegetation area;

at least one calculator which combines signals corresponding to the first and second spectral bands to provide an image of vegetation parts of the vegetation area having a hydric deficit; and a color coder for color coding the combination of signals and for applying artificial colors by additive synthesis making parts of the vegetation area having a fire risk stand out.

13. A system as claimed in claim 12, wherein:

at least part of the image processing unit is placed aboard the aircraft.

14. A method for determining flammability of different parts of a vegetation area flown over by an aircraft, in order to facilitate preventive or fire fighting actions, comprising:

at least one aircraft equipped with an image acquisition unit acquiring images of the vegetation area from radiation emitted and reflected by the ground and a plant cover thereof by moving above the vegetation area;

detecting changes of a state of the plant cover by analysis of the light received in two spectral bands, a first spectral band ($\lambda_1$) selected in a red part of a visible spectrum according to a type of vegetation, and a third spectral band ($\lambda_3$) in the thermal infrared spectrum, selected to locate parts of the vegetation area having a higher temperature than the surrounding parts thereof;

selecting a second spectral band ($\lambda_2$) which reproduces a state of turgescence of aerial parts of the plant cover in a near infrared spectrum; and forming a composite image by color coding and superposing the images obtained in the three spectral bands to show fire risks of the vegetation area.

15. A method as claimed in claim 14, further comprising:

weighting signals forming each of the images that are part of the composite image according to an average state of the vegetation area.

16. A method as claimed in claim 14, wherein:

wavelengths ($\lambda_1$) of the first spectral band are selected in the range of 0.6 $\mu$m<$\lambda_1$<0.7 $\mu$m; and a bandwidth of the first spectral band is selected according to a dominant vegetal population of the vegetation area.

17. A method as claimed in claim 14, wherein:

wavelengths ($\lambda_1$) of the first spectral band are substantially 0.65 $\mu$m.

18. A method as claimed in claim 14, wherein:

wavelengths ($\lambda_2$) of the second spectral band are selected in the range 0.8 $\mu$m<$\lambda_2$<1.1 $\mu$m.

19. A method as claimed in claim 14, wherein:

the wavelengths ($\lambda_2$) of the second spectral band are substantially 0.9 $\mu$m.

20. A method as claimed in claim 14, wherein:

the wavelengths ($\lambda_3$) of the third spectral band are selected in the range 8 $\mu$m<$\lambda_3$<14 $\mu$m.

21. A method as claimed in claim 14, wherein:

the wavelengths ($\lambda_3$) of the third spectral band are selected in the range 10.5 $\mu$m<$\lambda_3$<12.5 $\mu$m.

22. A method as claimed in claim 14, wherein:

the wavelengths ($\lambda_3$) of the third spectral band are selected in the range 3 $\mu$m<$\lambda_3$<5 $\mu$m.

23. A method as claimed in claim 14, wherein:

the composite image is formed aboard the aircraft prior to being transmitted by radio to a ground processing station.

24. A system for determining flammability of different parts of a vegetation area flown over by an aircraft in order to facilitate preventive actions, comprising:

an acquisition device for acquiring images of the vegetation area from radiation emitted and reflected by a ground area and a plant cover thereof;

a radio transmission device connecting the aircraft to a ground station;

a selector which selects at least three spectral bands, a first spectral band selected in a red part of a visible spectrum according to a type of vegetation, a second spectral band selected in a near infrared spectrum, for reproducing a state of turgescence of aerial parts of the plant cover, and a third spectral band selected in a thermal infrared spectrum for locating parts of the vegetation area having a higher temperature than surrounding parts thereof; and an image processing unit which forms a composite image obtained by coding and by superposing images obtained in the three spectral bands which shows fire risks of the vegetation area.

25. A system as claimed in claim 24, wherein at least part of the processing unit is placed aboard the aircraft.

* * * * *